July 20, 1954     H. E. REPLOGLE     2,683,923
METHOD OF MAKING COMPOSITE METAL PRODUCTS
OF FUSION WELDED CONSTRUCTION Filed Jan. 31, 1950     4 Sheets-Sheet 1

INVENTOR.
Hugh E. Replogle
BY
Webb, Mackey + Burden.
HIS ATTORNEYS

July 20, 1954  H. E. REPLOGLE  2,683,923
METHOD OF MAKING COMPOSITE METAL PRODUCTS
OF FUSION WELDED CONSTRUCTION
Filed Jan. 31, 1950  4 Sheets-Sheet 2

INVENTOR.
Hugh E. Replogle
BY
HIS ATTORNEYS

July 20, 1954   H. E. REPLOGLE   2,683,923
METHOD OF MAKING COMPOSITE METAL PRODUCTS
OF FUSION WELDED CONSTRUCTION
Filed Jan. 31, 1950   4 Sheets-Sheet 3

INVENTOR.
Hugh E. Replogle
BY
HIS ATTORNEYS

July 20, 1954

H. E. REPLOGLE 2,683,923

METHOD OF MAKING COMPOSITE METAL PRODUCTS
OF FUSION WELDED CONSTRUCTION

Filed Jan. 31, 1950

INVENTOR.
Hugh E. Replogle
BY
Webb, Mackey & Burden
HIS ATTORNEYS

Patented July 20, 1954

2,683,923

UNITED STATES PATENT OFFICE 2,683,923

METHOD OF MAKING COMPOSITE METAL PRODUCTS OF FUSION WELDED CONSTRUCTION

Hugh E. Replogle, Coraopolis, Pa., assignor to Universal-Cyclops Steel Corporation, Bridgeville, Pa., a corporation of Pennsylvania Application January 31, 1950, Serial No. 141,479

3 Claims. (Cl. 29—189)

This invention relates to a method of making composite metal products. The composite metal product of the present invention may be used in hack saw blades, band saw blades, chain saws, paper knives, wood knives, shear blades, blanking dies, punches, milling cutters, lathe beds, turbine blades, pump shafts, valves, and in various other applications where either a hard cutting edge, a wear-resisting surface, a corrosion-resisting surface, or heat-resisting surface which is supported by a backing section having certain advantageous characteristics as hereinafter described is required.

Composite metal products have previously been made for use as cutting tools such as hack saw blades, by welding together a high speed steel cutting edge section and a backing section by employing a resistance welding method and pressing together the two sections to be welded. As a result of the pressure required in resistance welding, a wasteful flash is formed which must be annealed and then removed by grinding or machining all of which are costly operations. The product resulting from such resistance welding has essentially a line contact between the high speed steel cutting section and the backing steel section. Because of this line contact between the two steels, having different coefficients of expansion, joined together by resistance welding, subsequent heat treatment of the composite product to harden the high speed steel cutting edge frequently causes considerable distortion of the blade, sets up objectionable stresses therein, and often causes separation at the weld, resulting in considerable scrap loss.

Another method previously used for the forming of composite products consisted in the casting of one steel around an insert of another steel and rolling the ingot thus formed into a product from which finished sections could be obtained. However, to obtain the product in finished sections it was necessary to machine away a considerable quantity of the covering steel to expose the insert, involving an impractical procedure not adaptable to conventional methods of production and producing an excessive amount of scrap as well as inaccurate strips. The product resulting from this method also has a line contact between the two steels and, therefore, possesses the same objectionable characteristics as the material produced by resistance welding.

The objects of this invention are: (1) To provide a method of producing a composite fusion welded product which is practical and economical. (2) To produce a composite fusion welded assemblage of work zone sections and backing zone sections which can be either hot and/or cold worked to produce a wrought structure throughout the section. (3) To make a composite fusion welded product in which the junction zone is of substantial width and performs distinct functions. (4) To make a composite fusion welded product of dissimilar steels which, in the final heat treated condition, retains the desired physical characteristics of the individual steels. (5) To make a composite fusion welded product which does not distort excessively during heat treatment. (6) To make a composite fusion welded product containing a zone of substantial width in which the coefficient of expansion varies gradually from that of one metal section to that of the other metal section. (7) To produce a composite fusion welded product having certain material or cost advantages over similar products previously made by conventional methods.

In accordance with my invention, I provide a composite metal product of fusion welded construction which consists of at least three distinct zones, as follows:

1. A cutting, wearing, corrosion or heat resisting zone.
2. An intermediate fusion welded zone of substantial width.
3. A backing zone.

In the accompanying drawings which illustrate a preferred embodiment of my invention and certain prior structures:

Figure 1 is a front elevation of a composite hack saw blade blank or similar article of fusion welded construction comprising a cutting, wearing, corrosion or heat resisting zone 1, a backing zone 2, and an intermediate fusion zone 3 of substantial width;

Figure 10:
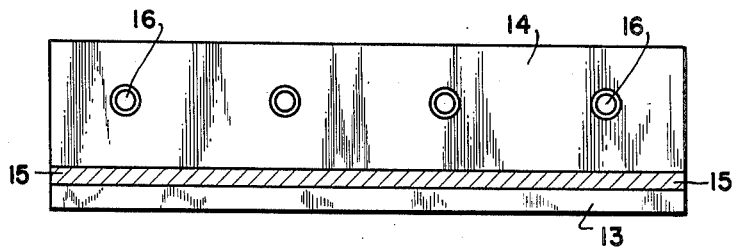
Figure 11:
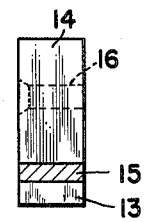

Figure 10 is a front elevation of a fusion welded composite shear blade made according to this invention and comprising a wearing zone 13, a backing zone 14 and an intermediate fused zone 15; and Figure 11 is an end elevation of the shear blade shown in Figure 10.

Figure 1:
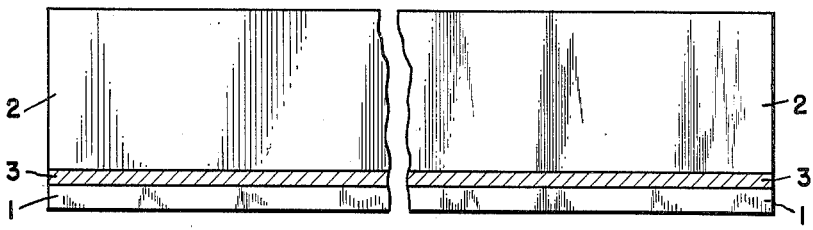

Referring more particularly to the accompanying drawings, a composite fusion welded hack saw blade blank or similar article is illustrated in Figure 1. This blank comprises a cutting, wearing or corrosion or heat resisting zone 1, hereafter referred to as a work zone, made of an alloy having cutting ability such as a high speed steel, or a wear resisting alloy such as a high carbon-high chrome steel, or a corrosion resisting alloy such as stainless type 310, a backing zone 2 made of tough steel for an article to be used for cutting or wearing purposes or an alloy possessing properties as required by the end use of the composite section, and an intermediate zone 3 containing alloying ingredients in amount less than in the work zone 1 but greater than in the backing zone 2. The steel or alloy selected for each section depends upon the use to be made of the composite fusion welded section and the properties required therein.

Table I, below, by way of illustration, but not by way of limitation, gives examples of high speed steels that are suitable for use where a cutting zone 1 is required. Table II, below, again by way of illustration, but not by way of limitation, gives examples of steels that are suitable for use for wear resisting applications. Table III, below, again by way of illustration, but not by way of limitation, gives examples of steels and alloys that are suitable for corrosion or heat resisting applications.

TABLE I

*High speed steels*

| No. | C | Cr | W | V | Mo | Co |
|---|---|---|---|---|---|---|
| 1 | .70 | 4.00 | 18.00 | 1.20 | | |
| 2 | .83 | 4.40 | 18.50 | 2.25 | .65 | |
| 3 | .70 | 4.00 | 18.00 | 1.10 | .50 | 4.75 |
| 4 | .77 | 4.65 | 18.50 | 2.05 | 1.00 | 9.00 |
| 5 | .78 | 3.75 | 1.55 | 1.15 | 8.70 | |
| 6 | .82 | 4.15 | 6.00 | 2.00 | 5.00 | |
| 7 | 1.00 | 4.00 | 6.25 | 2.35 | 6.25 | |
| 8 | .83 | 4.00 | 1.55 | 1.25 | 8.25 | 5.00 |
| 9 | .87 | 4.00 | 1.65 | 2.00 | 8.70 | 8.25 |
| 10 | 1.22 | 4.50 | 1.45 | 3.00 | 8.50 | 8.50 |
| 11 | .82 | 4.00 | 6.00 | 2.00 | 5.00 | 4.50 |
| 12 | .87 | 4.00 | | 2.00 | 8.00 | |

TABLE II

*Wear resisting steels*

| No. | C | Cr | W | V | Mo | Co | Mn |
|---|---|---|---|---|---|---|---|
| 1 | 1.00 | 5.25 | | .25 | 1.10 | | |
| 2 | .80 | 5.25 | | .25 | 1.10 | | |
| 3 | 2.25 | 12.00 | | .20 | | | |
| 4 | 1.50 | 12.00 | | .25 | .80 | | |
| 5 | 1.35 | 13.00 | | | .70 | 3.00 | |
| 6 | 1.35 | | 3.50 | | | | |
| 7 | 1.20 | .40 | 1.60 | .20 | | | |
| 8 | .90 | .50 | .50 | .20 | | | 1.20 |
| 9 | 1.00 | .50 | | .20 | .50 | | |
| 10 | 1.05 | 1.35 | | | | | |
| 11 | .50 | 7.00 | 7.00 | | | | |
| 12 | 1.00 | 4.25 | | | .50 | .50 | |
| 13 | .40 | 5.00 | | 1.00 | 1.50 | | |
| 14 | .35 | 5.00 | 1.50 | | 1.70 | | |
| 15 | .50 | 1.75 | 2.25 | .25 | .50 | | |
| 16 | .30 | 12.00 | 12.00 | .90 | | | |
| 17 | 1.00 | | | | | | 13.00 |
| 18 | 1.20 | | 1.20 | | | | |

TABLE III

*Corrosion and heat resisting steels*

| No. | C | Mn | Si | Cr | Ni | W | Mo | Co | Cb | Other Elements |
|---|---|---|---|---|---|---|---|---|---|---|
| 1 | .12 | .50 | .50 | 12.75 | | | | | | |
| 2 | .12 | .75 | .50 | 13.00 | | | .50 | | | S, .25 |
| 3 | .12 | .60 | .50 | 17.00 | | | | | | |
| 4 | .35 | 1.00 | 1.00 | 13.00 | | | | | | |
| 5 | .60 | 1.00 | 1.00 | 17.00 | | | | | | |
| 6 | .90 | 1.00 | 1.00 | 17.00 | | | .50 | | | |
| 7 | 1.10 | 1.00 | 1.00 | 17.00 | | | | | | |
| 8 | .06 | .50 | .50 | 18.00 | 8.00 | | | | | |
| 9 | .06 | .50 | .50 | 18.00 | 8.00 | | 2.50 | | | |
| 10 | .06 | .50 | .50 | 18.00 | 8.00 | | | | | Ti, .50 |
| 11 | .06 | .50 | .50 | 18.00 | 8.00 | | | | .80 | |
| 12 | .08 | 1.50 | .50 | 25.00 | 12.00 | | | | | |
| 13 | .08 | 1.50 | .50 | 25.00 | 20.00 | | | | | |
| 14 | .15 | .65 | 1.10 | 8.00 | 20.00 | | | | | |
| 15 | .40 | .65 | 1.10 | 8.00 | 20.00 | | | | | |
| 16 | .25 | .40 | .40 | 28.00 | | | | | | |
| 17 | .15 | 1.25 | .75 | 21.00 | 12.00 | | | | | |
| 18 | .08 | 1.25 | .50 | 28.00 | 4.00 | | | | | |
| 19 | .40 | .75 | .75 | 13.00 | 13.00 | 2.50 | 1.75 | 10.00 | 3.00 | |
| 20 | .37 | 1.50 | .75 | 20.00 | 20.00 | 4.00 | 4.00 | 40.00 | 4.00 | |
| 21 | .15 | 1.50 | .50 | 21.00 | 20.50 | 2.50 | 3.00 | 20.00 | 1.00 | N, .15 |
| 22 | .30 | 1.00 | .55 | 20.00 | 9.00 | 1.50 | 1.50 | | .50 | Ti, .40 |
| 23 | .08 | 1.50 | 2.25 | 25.00 | 20.00 | | | | | |
| 24 | .45 | .60 | .50 | 14.00 | 14.00 | 2.50 | .35 | | | |
| 25 | .10 | .50 | .60 | 19.00 | 8.50 | 1.25 | .40 | | .50 | Ti, .40 |
| 26 | .10 | 1.50 | .50 | 15.00 | 35.00 | | | | | |

So far as the backing material is concerned, any suitable backing material having the desired toughness or possessing other properties as required by the application may be used. By way of illustration, but not by way of limitation, the steels listed in Table IV, below, are examples of suitable backing materials.

TABLE IV

*Backing material*

| No. | C | Mn | Si | Cr | Ni | Mo | V |
|---|---|---|---|---|---|---|---|
| 1 | .10 | .40 | .20 | | | | |
| 2 | .20 | .40 | .20 | | | | |
| 3 | .30 | .70 | .20 | | | | |
| 4 | .40 | .70 | .20 | | | | |
| 5 | .40 | .80 | .30 | | .65 | 1.25 | |
| 6 | .42 | .50 | .30 | | 1.00 | 1.75 | |
| 7 | .38 | .85 | .30 | | | | .25 |
| 8 | .30 | .50 | .30 | .90 | | .20 | |
| 9 | .38 | .80 | .30 | .50 | .50 | .25 | |
| 10 | .35 | .70 | .30 | .70 | 1.80 | .35 | |
| 11 | .40 | .70 | .30 | | 1.80 | .25 | |
| 12 | .40 | .80 | .30 | .80 | | | |
| 13 | .30 | .80 | .30 | .80 | | | .15 |
| 14 | .40 | .80 | .30 | .95 | | | .20 |
| 15 | .50 | .80 | .30 | .95 | | | .20 |

The composite fusion welded section shown in Figure 1 may be made by the method now to be described with reference to Figure 2, and relates more particularly to the production of composite fusion welded material in sheet form. A plurality of work zone sections 4 (which ultimately form the work zone 1 shown in Figure 1) and a plurality of backing zone sections 6 (which ultimately form the backing zone 2 shown in Figures 1) are placed in the clamping device of a submerged arc welding machine, or any other welding device, and are arranged with the edges 8 of the work zone sections and the edges 7 of the backing zone sections adjacent to each other. These edges of the dissimilar steels may vary as regards distance apart, depending on the amount of intermediate zone material that it is desired to produce. For instance, the edges 7 and 8 may be butted together so that they actually touch or they may be definitely spaced apart by some suitable gap, such as $\frac{1}{16}''$ or $\frac{1}{8}''$, to produce the desired width of intermediate zone. The sections 4 and 6 are then fusion welded together. This is accomplished readily by using a continuous submerged arc welding head and a weld wire or rod in the usual fashion with the edges of the two sections spaced apart by a predetermined amount, such as for instance $\frac{1}{16}''$, and depositing the fused weld metal between the juxtaposed edges. The edges of the two sections are melted in the welding process so that the weld metal is a combination consisting of some of the work zone metal, some of the backing zone metal, and the metal from the weld wire or rod. As a consequence, the fused zone 5 (which ultimately forms the intermediate zone 3 shown in Figure 1), even though an ordinary low carbon steel welding wire or rod is used, has a composition intermediate the composition of the work zone material and the backing zone material, and over the region of the intermediate zone 5 the composition varies gradually from that of the work zone material to that of the backing zone material.

Although reference is made to the use of a continuous submerged arc welding head for performing the welding operation, it is possible to join the two sections by any welding method, as, for example, oxyacetylene, atomic hydrogen arc, or inert-gas-shielded arc welding, which will produce an intermediate fused zone of substantial width as herein described.

The size of the electrode used in the welding operation is controlled depending upon the thickness of the sections being welded and the distance between them so that a fused zone having a smooth surface is obtained. The raised portion of the fused zone is so slight and of such character that it does not require removal as does the bead or flash created by the resistance welding method of making composite welded structures.

The composite fusion welded assemblage is relieved of stresses by heating to a temperature of approximately 600° F. to 1400° F., and, if it is to be used in this form without reduction by hot or cold working, it is then annealed at a temperature suitable for annealing the material comprising the work zone. When the work zone is a cutting material the composite section preferably is annealed at temperatures of approximately 1400° F. to 1600° F., while other materials may require somewhat higher annealing temperatures. The strain relieving and annealing temperatures will depend upon the compositions of the metals employed, but ordinarily the annealing is carried out at a temperature below the upper critical temperature of the work zone alloy.

If necessary, the composite fusion welded assemblage, after annealing, is then cleaned, as for example, by pickling or sand blasting.

Although the composite fusion welded assemblage can be cut at this stage into sizes suitable for the end use, it is a feature of this invention that after the stress relieving treatment the assemblage can be further processed by hot or cold working, such as forging or rolling, which operation refines the cast structure of the fused zone so that the final product has a structure of normal wrought steel possessing a maximum of toughness and strength. The resulting wrought product is then annealed at a temperature suitable for annealing the material comprising the work zone as previously described.

Figure 2:
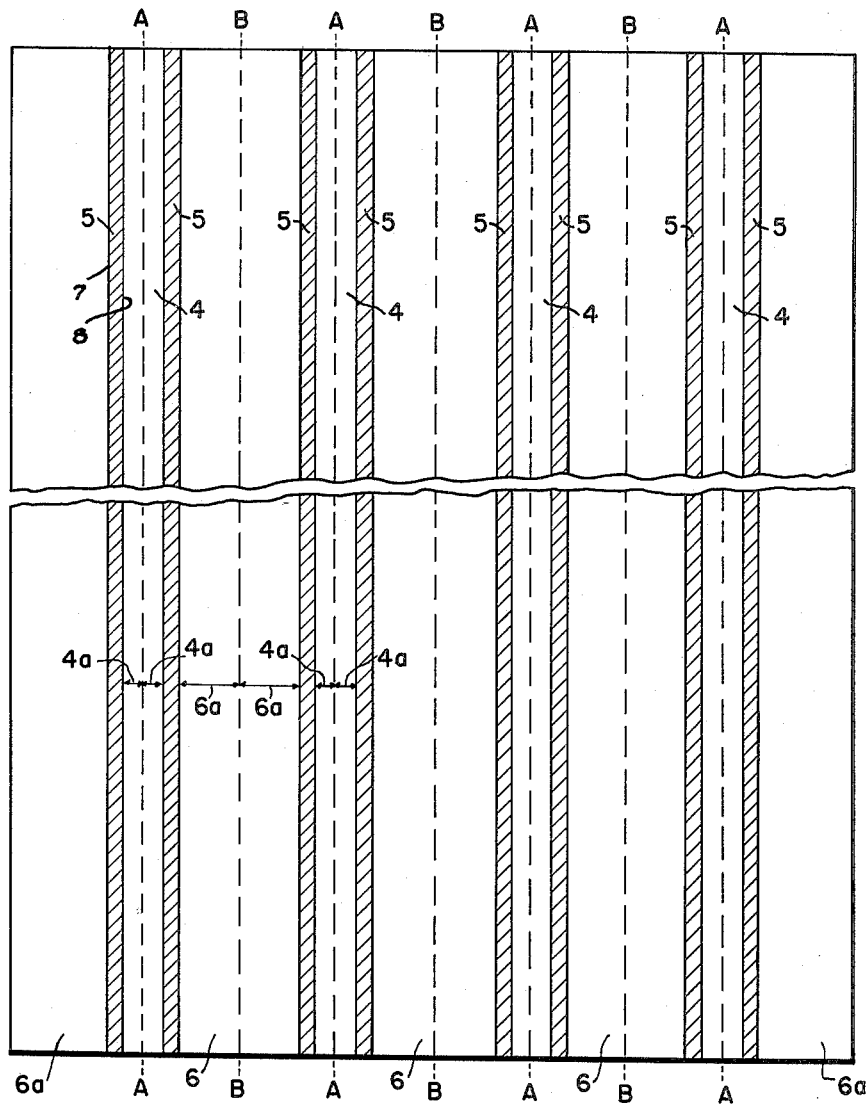
Figure 2 is a plan view of an assemblage of a plurality of work zone sections and backing zone sections united together by fusion welding to form a composite fusion welded assemblage which may be severed along the lines A—A or the lines B—B to produce a plurality of fusion welded composite hack saw blanks or other similar articles.

Composite fusion welded blanks are then formed from the composite fusion welded assemblage by severing it along the line A—A and along the line B—B or along two lines A—A of Figure 2. If severing occurs along a line A—A and along a line B—B, single blanks are formed, each comprising a backing portion 6a, an intermediate zone 5, and a work portion 4a. This single blank is then formed by machining, grinding or other process into final form for the end use and, if necessary, is heat treated to harden it or place it in condition for use. For certain purposes, it is advantageous to sever the composite assemblage along two lines A—A and thus form double blanks, each double blank having a longitudinal central section 6 of backing material which is substantially twice the width of the section 6a, a work zone section 4a along each side of the central section 6, and an intermediate zone 5 between each of the edge section 4a and the central backing section 6. This double blank is then formed by machining, grinding, or other process into form for the end use and afterwards heat treated to harden it or place it in condition for use. The double blank is then severed along the line B—B to produce two single composite sections. Such a double blank has definitely less tendency to distort in heat treatment than has a single blank. In certain circumstances there are economical advantages in using a double blank.

Although in the method illustrated in Figure 2 a plurality of work zone sections 4 and a plurality of backing zone sections 6 are employed to form, after severing, a plurality of composite blanks, it will be understood that this invention is also applicable to employing only a single work zone section 4a and a single backing zone section 6a of desired width and fusion welding these two sections together in the manner as described to form a single composite fusion welded blank as illustrated in Figure 1.

The sections of the work zone material as well as the sections of backing zone material are obtained from strip, sheets, plates or bars of steel or alloy of suitable thickness, width and length to produce the desired size of composite fusion welded section. For example, if the final composite section is to be a sheet product, sections of sheet or plate of greater thickness than the final product preferably are used. These sections are of sufficiently greater thickness than the final product to permit hot and/or cold working to obtain the desired refinement of the cast structure resulting from the fusion welding operation.

Any suitable kind of weld wire or rod can be used. The type to be used for manufacturing any particular product will depend upon the characteristics desired in the finished product. In cases where the thickness of the sections to be joined and the spacing between them is not very great, an ordinary low carbon welding wire or rod can be used and will produce the desired composition of the intermediate zone. However, in other cases, where the sections employed are of considerable thickness, are an unusual distance apart, or where special properties are required in the intermediate zone, a weld wire or rod, containing alloying elements sufficient to obtain the desired characteristics in the intermediate zone, is employed. In the process of fusion welding the sections together, the edge portions of the work zone material and the edge portions of the backing zone material are reduced to a molten state at the same time as the welding wire or rod so that there is obtained a complete diffusion of the three compositions with the result that the fusion zone has an alloy content intermediate the average composition of the two sections and varies gradually in composition from that of the one section to that of the other section.

The intermediate zone 3, Figure 1, according to my invention, is of substantial width, by which I mean a width of at least .150''. It is not necessary, however, to the obtaining of an intermediate zone having a width of at least .150'', that the edges of the two sections to be joined be spaced apart by this distance. In fact, the edges can be placed in abutting relationship and joined, since the edge portions of the two sections to be joined are melted in the process, and the steel of the edge portions fused with the steel of the weld wire or rod so as to form an intermediate zone 3 having a width of at least .150''.

The intermediate zone 3 of substantial width produced in accordance with my invention provides a composite section which has the following advantages over other composite sections produced by previously used methods:

(1) It gives added support to the extremely hard cutting or wear zone of an article because it is considerably harder and retains in use a considerably higher hardness than the backing material. It will be understood that the backing material has to be machined to form the finished product and therefore that it is impractical to make the backing material too hard. Furthermore, if the backing material were made too hard the product would break more readily. Such support, being of substantial width, is much stronger than a support constituted by a mere line junction such as is formed by resistance welding.

(2) Greater rigidity is imparted to the article by having an intermediate zone having considerable rigidity and hardness in itself. In cutting tools the cutting efficiency of the tool is increased and straighter cutting can be performed because of the increased rigidity. In other articles the greater rigidity imparts greater resistance to deformation.

(3) The greater strength and rigidity of the intermediate zone permits heat treating the work zone of articles formed from my composite product to a higher hardness thus increasing the useful life of the article.

(4) It provides a non-shatterable composite section which is an extremely important safety factor. Because of the substantial width of the intermediate zone and the gradual transition in composition from the work zone through the intermediate zone to the backing zone, particles do not shatter and fly from the hard work zone as has been the experience with composite sections formed by other methods but, while they break through the hard work edge, they are held in place by the intermediate zone.

(5) It permits hot or cold working of the composite assemblage without distortion. Hot and/or cold working of the material produced by my method refines the structure of the fused zone and transforms it to wrought material, while composite material produced by resistance welding contains a line junction having the coarse structure of cast metal and, in turn, possesses the undesirable properties of cast material.

(6) In the intermediate zone there is a gradual transition in the coefficient of expansion from that of the material comprising the work zone to that of the material comprising the backing zone.

Figure 4:
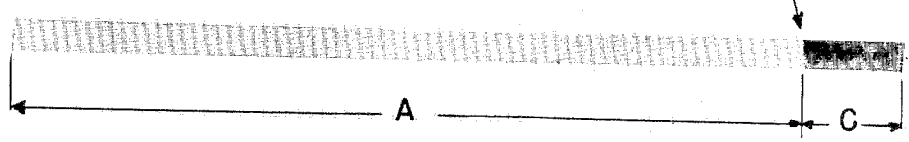
Figure 4 is a photograph at 4 magnifications showing the line of junction of a composite section made by resistance welding according to a prior known method in which A designates the backing zone, B the line of junction and C the work zone.
Figure 5:
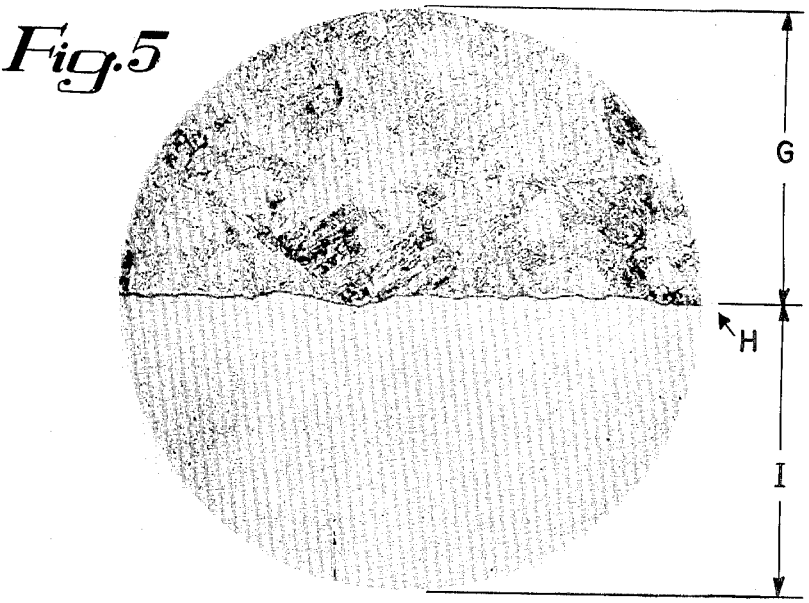
Figure 5 is a photograph at 100 magnifications of the junction line produced by resistance welding according to a prior known method showing the backing zone G, the work zone I, and the line of junction H consisting of an "as welded" structure.
Figure 6:
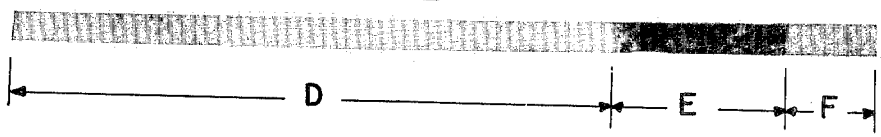
Figure 6 is a photograph at 4 magnifications showing the region of junction of a fusion welded composite section made according to this invention in which D designates the backing zone, E the region of junction, and F the work zone.
Figure 7:
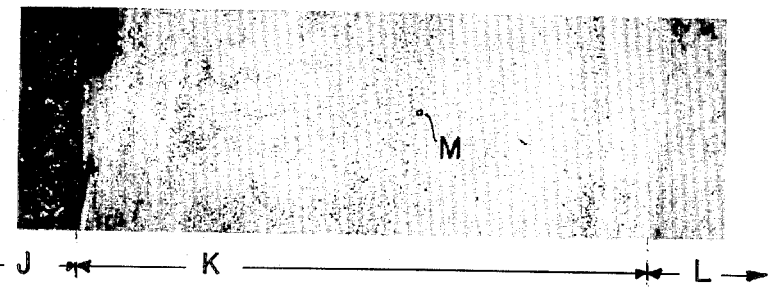
Figure 7 is a photograph at 15 magnifications showing the region of junction of a composite fusion welded section made according to this invention in which J designates the backing zone, L the work zone, and K the intermediate fused zone of substantial width; in this case, approximately .300" wide. Reference letter M designates a point in the center of the intermediate zone K.

A comparison of Figures 4 and 6, both of which are taken at 4 magnifications, shows the distinct differences in the kind of junction made between the work zone material and the backing zone material in composite metal products made by a resistance welding method as shown in Figure 4 as compared with a fusion welding method according to my invention as shown in Figure 6. It will be seen that in Figure 4 the junction B is a mere line junction between the work zone material C and the backing zone material A, whereas in Figure 6 the fusion zone is of substantial width, being, in this instance, approximately $\frac{1}{16}$ of an inch wide. The mere line junction obtained according to the resistance welding method also is shown in Figure 5, which is taken at 100 magnifications. The width of the junction H shown in Figure 5 is insignificant as compared to the width E shown in Figure 6 and taken at 4 magnifications, or as compared with the width K shows in Figure 7 and taken at 15 magnifications. The width of the intermediate fusion welded zone K in Figure 7 is approximately .300 inch.

An intermediate fusion welded zone obtained according to my invention has the advantages previously described as compared with a mere line junction between the work zone material and the backing zone material.

Figure 8:
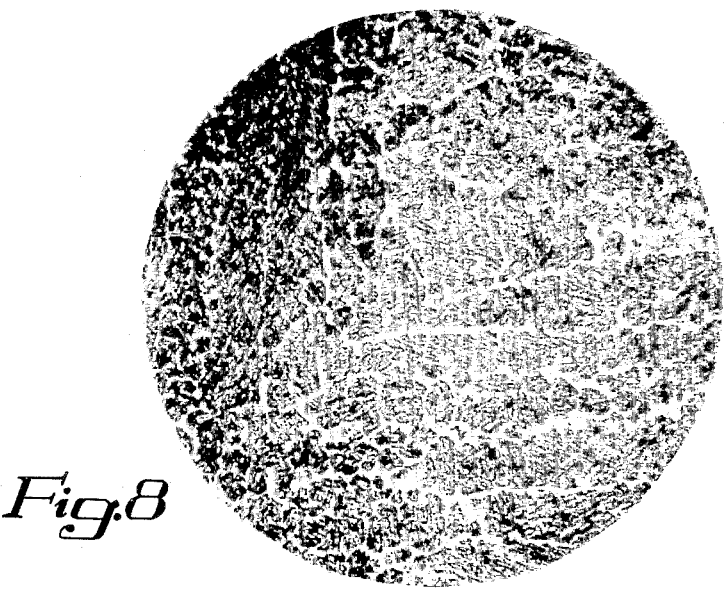
Figure 8 is a photograph at 500 magnifications taken at the point M of Figure 7 and shows the coarse dendritic structure of the fused intermediate zone in the "as welded" condition.
Figure 9:
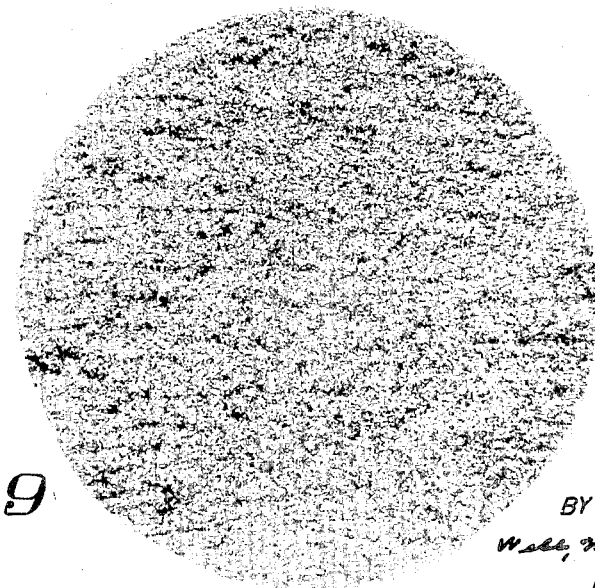
Figure 9 is a photograph at 500 magnifications taken at the point M of Figure 7 and shows the refined structure of the intermediate zone after hot rolling.

Because of the character of the fusion welded assemblage of a plurality of sections of work zone material and a plurality of sections of backing zone material, such composite fusion welded assemblage can be hot rolled or otherwise hot worked. This hot rolling changes the coarse dentritic structure of the fused intermediate zone shown in Figure 8 into the refined structure shown in Figure 9.

The following specific examples will describe the steps involved in producing composite fusion welded sections in accordance with my method and some uses to which it may be applied. It will be understood that it is not the intention that the use of my composite fusion welded section be limited to the examples given, but that it can be used for other articles where it is advantageous to make use of the properties which this material possesses. The dimensions given in these examples are not to be construed as limiting dimensions, but are used only for descriptive purposes.

EXAMPLE 1

The invention will now be described particularly as applied to hack saw blades and their method of manufacture.

Figure 3:
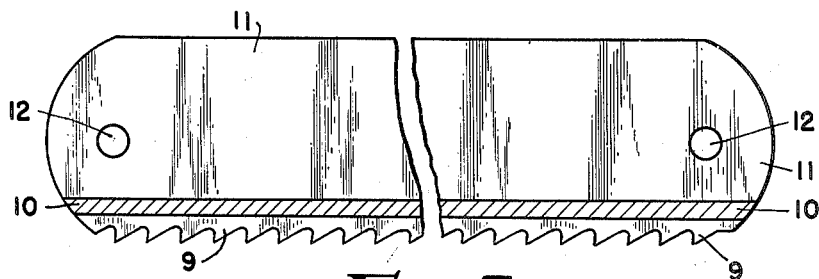
Figure 3 is a front elevation of a hack saw blade made from the blank of Figure 1.

In accordance with my invention the hack saw blade consists of three distinct zones as shown in Figure 3 including a cutting edge zone 9, an intermediate fused zone 10 and a backing zone 11. Reference numeral 12 designates eye pin holes used for securing the blade in the hack saw frame. Table I contains a list of high speed steels which are typical of those used for cutting purposes and which may be used for the cutting edge zone 9 of my composite fusion welded hack saw blade. The backing zone 11 can consist of any material which possesses the desired toughness and strength, such as any of the steels listed in Table IV. For instance, SAE-6130 has been used for this purpose and gives the desired results. The zones 9 and 11 preferably are constituted of sections of hot rolled and annealed sheet.

A common size of power hack saw blade is one having a thickness of .072", a width of 1⅝" and a length of 18". The sections of backing zone material and cutting zone material are selected of such size that they can be made into a composite fusion welded assemblage which can be severed into sections for finishing to this size blade. The thickness of the sheet sections for fusion welding will be greater than the thicknesses of the final composite sections to permit hot rolling of the fusion welded assemblage to obtain the desired refinement of the structure of the fused zone 10; in this example, the sheet sections would be .135" thick. The width of the respective sections will depend upon the number of teeth per inch to be machined into the finished blade. The width of the cutting edge zone 9 in the finished blank is sufficient so that the necessary cutting portion of the tooth may be made in this zone of the blank, or may extend into the intermediate zone. The width of the backing zone section 11 is such that along with the intermediate zone and cutting edge zone, it will finish a blank 1⅝" wide. The length of the sections is such that it will finish a blank 18" long or a strip which will be a multiple of this length. Sections to be used for portions 6 and 4 of the assemblage, Figure 2, subject to later severing are twice the width of the single blank sections.

A plurality of the high speed steel sections 4 and a plurality of backing sections 6 are alternately placed in the clamping device of a continuous submerged arc welding machine and are arranged with the edges 8 of the cutting sections and edges 7 of the backing sections adjacent to each other. The sections 4 and 6 are then fused together using the continuous submerged arc welding head and a weld wire in the usual fashion.

As soon as the fusion welded assemblage is removed from the welding machine, it is given a stress relieving treatment by heating to 1200° F. to 1400° F. and then cooling to room temperature, followed by an annealing treatment, if necessary.

The fusion welded assemblage is then heated in the usual type of furnace, used for the heating of sheet product for hot rolling, to a temperature suitable for hot rolling of the material comprising the composite structure. After reaching the proper rolling temperature the assemblage is rolled on a mill of the usual type used for rolling of sheet product to the final thickness of .072". This rolling operation refines the cast structure of the fused zone and transforms it to a wrought structure which gives added strength and toughness to the assemblage. The assemblage, after rolling, is annealed at a temperature of 1300° F. to 1600° F., depending upon the physical characteristics required in the cutting zone.

The assemblage can be cut into single blank sections as previously described and shown by Figure 1, but it is also possible, in the case of hack saw blades, to cut the assemblage into double blank sections. Teeth are then formed in the cutting zone, the teeth set, the pin holes 12 formed and the blade heat treated to harden the cutting edge.

It is sometimes advantageous to use the double blank with cutting zones 4a on either edge by cutting the assemblage along two lines A—A. Teeth are formed in each of the cutting zones 4a, pin holes formed in each of the two portions 6a and the blade heat treated to harden the cutting zones. After heat treatment the double blank is severed through the backing material along a line B—B to produce two single composite hack saw blades. The use of a balanced section as represented by a double blank results in less distortion during the heat treatment. It also means that in the heat treating operation only half as many pieces need be handled and yet be heat treated in the same time as a single blank.

As illustrative of a hack saw blade made as above described, in one instance the high speed steel cutting zone sections 4 were of the following composition:

| | |
|---|---|
| C | .85 |
| Cr | 3.94 |
| W | 6.24 |
| Mo | 5.04 |
| V | 2.00 | and the backing steel sections 6 were of the composition:

| | |
|---|---|
| C | .27 |
| Cr | .85 |
| V | .19 |

The weld wire was an ordinary low carbon steel welding wire containing about .08% carbon with no substantial amount of alloying constituents.

The intermediate zone 5 resulting from the use of such high speed steel section 4, weld wire, and backing steel section 6, had the following composition:

| | |
|---|---|
| C | .37 |
| Cr. | 1.68 |
| W | 2.42 |
| Mo | 2.12 |
| V | .76 |

It will be seen that the contents of carbon and alloying constituents in the intermediate zone 5 are less than those in the high speed steel zone 4, but greater than those in the backing zone 6. Examination of this zone under a microscope revealed a structure varying gradually from that of the high speed steel zone 4 to that of the backing steel zone 6 indicating that the composition of the intermediate zone 5 varied gradually from that of the high speed steel zone to that of the backing steel zone. The analysis of the intermediate zone 5 and the results of the microscope examination verifies that the weld wire material has been completely diffused in this zone.

As previously stated, hack saw blades have in the past generally been made out of solid high speed steel or other solid steel possessing good cutting ability, but they were objectionable for the reason that they often broke in service. In breaking, the blade shattered and fragments of it flew in all directions, endangering the operator of the hack saw machine. One departure from this general practice was to weld together a backing section and a high speed steel cutting edge employing resistance welding. This resistance welding method resulted in a composite blade having essentially a line junction between the two materials and upon stressing in service the high speed steel cutting edge shattered and the backing material also broke. Hack saw blades made by the present invention will not shatter when stressed in the same way. Because of its high hardness, the high speed steel cutting edge cracks through and the intermediate zone cracks partially through, but pieces do not break from the blade and the backing material does not break. Thus the intermediate zone acts to absorb the tendency for complete breakage as well as to hold the cracked high speed steel cutting edge in place and prevent it from breaking away from the balance of the blade.

It will be noted in the preceding description of my method of making a composite fusion welded hack saw blade that it was not necessary to machine, grind, or in any other way prepare the fused area for further processing. The fused area is of such character that it can be hot rolled without further preparation. In making a composite welded hack saw blade by the resistance welding method, it is necessary to anneal and then machine or grind the excess flash formed at the junction line of the welded blank before proceeding with the manufacture of the hack saw blade.

The intermediate zone of my invention is a zone of sufficient width and strength to permit hot rolling of the section without rupturing this region or breaking the high speed steel cutting edges. The hot rolling refines the cast structure of the fused zone and increases the toughness and strength properties of it, as well as those of the complete composite welded section.

It is further characteristic of a composite hack saw blade made by my method that a single hardening and tempering treatment is sufficient to produce a tool having satisfactory cutting properties. Such heat treatment results in different hardnesses in the cutting edge zone 9, the intermediate zone 10 and the backing zone 11. A hack saw blade made according to this invention will ordinarily have a Rockwell hardness of C 62 to 67 in the cutting edge zone, C 45 to 60 in the intermediate zone and C 20 to 45 in the backing zone, these hardnesses depending on the composition of the various steels employed, the welding rod, and the hardening and tempering treatments used.

It is to be particularly noted that the intermediate zone has a hardness somewhat lower than that of the cutting zone, but higher than that of the backing zone. The combinations of cutting edge material, weld wire, and backing zone material are so selected that, after fusion welding, the composition of the intermediate zone is such that the hardening and tempering treatment results in a hardness in this zone which is between the hardnesses of the other two zones. The greater hardness of the intermediate zone over that of the backing zone imparts to the intermediate zone a rigidity substantially greater than that of the backing material, and, at the same time, gives an intermediate zone of high tensile strength and sufficient toughness to resist breakage. The increased rigidity resulting from the higher hardness of the intermediate zone permits treating the hack saw blade so as to produce a higher hardness in the cutting edge than would otherwise be practical, thus increasing the life of the blade. Straighter cutting and increased cutting efficiency are obtained from my blade because of the increased rigidity imparted to the blade by the intermediate zone, having considerable rigidity and hardness in itself.

Actual cutting tests show that, on the average, hack saw blades made by my method have a cutting life from 25% to 75% longer than that of other composite blades marketed today, as for example, those made by resistance welding. It is not at all unusual to obtain 100% better performance from my blade as compared with other blades made by resistance welding.

Hack saw blades sometimes fail by breaking out or elongation of the eye pin holes 12 because of the lack of sufficient strength of material in the region where the eye pin holes are formed. Where a backing material is used which does not possess sufficient strength to resist breakage or elongation of the eye pin holes, it is possible to increase the width of the intermediate zone, which possesses the required properties, so that the eye pin holes may be formed in this region.

EXAMPLE 2

There are many applications requiring wear resisting properties where it is necessary to provide a wear resisting surface having a rigid support and a backing region which it is possible to machine, which possesses considerable toughness, or which has other properties not obtainable in a solid section of the same material. My invention will now be described as it relates to an article which requires wear or abrasion resistance and particularly as it relates to a shear blade.

It is often desirable to change the position of bolt holes or otherwise machine the back of solid steel shear blades. With the conventional shear blade this requires the annealing of the previously hardened shear blade to soften it, performing the machining operations necessary, and then reheat treating. Such reheat treatment results in an undesirable structure in the shear blade, decreases its useful life, and quite naturally introduces cost consuming operations, as well as some breakage hazards in reheat treating. These disadvantages are overcome according to my invention.

Figures 10 and 11 illustrate a composite fusion welded shear blade made according to my invention. As shown in these figures, the shear blade has a wear resisting zone 13, a backing zone 14 and an intermediate zone 15. Reference numeral 16 designates bolt holes machined in the backing zone. The wearing zone 13 of the composite shear blade preferably is made of a high carbon-high chrome steel, such as No. 4 in Table II. The backing section 14 is of a composition which can be readily machined after the shear balde has been heat treated to bring the wearing zone 13 to the required hardness. Preferably a SAE-4130 steel, such as No. 8 in Table IV, is used and will give the desired properties.

The sizes of the sections used for making the fusion welded assemblage shown in Figure 2 will depend on the size of the finished shear blade required, and, as far as width and length are concerned, need not be specifically mentioned for the purpose of describing my invention. Since, however, it is preferable that the assemblage be hot and/or cold worked, a thickness of the section will be indicated to illustrate the reduction of this dimension by such processing. Sections for the wearing zones 4 and the backing zones 6 having a thickness of ½" are used for making the composite shear blade described herein. These sections are cut either from plates or bars.

The sections 4 and 6, as in th previous example, are alternately placed in the clamping device of a continuous submerged arc welding machine and arranged with the edges 7 and 8 of the backing and wearing sections adjacent to each other. The sections 4 and 6 are then welded together by welding from both sides simultaneously or by welding one side and then carrying out similar welding on the other side using the continuous submerged arc welding head and a weld rod, in the usual fashion, with the edges of the two sections butted together and the fused weld metal is deposited between the juxtaposed edges. As previously described, the edges of the two sections are melted in the fusion welding process and combined with the molten weld wire to form an intermediate zone 5 of substantial width and having a composition intermediate to that of the wearing surface material 4 and that of the backing material 6.

After welding, the composite assemblage is given a stress-relieving treatment.

The composite assemblage is then placed in a furnace and heated to a temperature suitable for rolling or forging the material of the wearing section. The backing material is of such a composition that satisfactory rolling can be performed at this same temperature. After reaching the proper temperature, the section is rolled on the usual plate or bar mill to a thickness of ⅜" which is sufficient to refine the cast structure of the fused zone.

After rolling, the assemblage is annealed and then cleaned by pickling or sand blasting.

The composite assemblage is then severed into either single or double blanks, as desired, and of a size which will make the finished shear blade.

After severing the shear blade blank, any machining necessary for forming the wearing edge is performed and, if desired, the machining of the backing zone is performed at this stage, although it is preferable to first heat treat the composite shear blade blank and then do the necessary machining of the backing zone. By performing the machining of the backing zone after heat treatment better alignment of bolt holes, etc. is obtained.

The single, or the double shear blade blank, as the case may be, is then heat treated at temperatures suitable for obtaining the required hardness in the wearing zone 13. This consists of heating the shear blade blank to a temperature of 1700° F. to 1850° F. and either oil or air quenching from this temperature, followed by tempering at a temperature up to 1200° F. The temperatures used for the hardening and tempering treatments depend on the required hardness in the finished shear blade. If the backing section has not previously been machined, any machining necessary is then done at this stage. If single blanks are used, the shear blade is ready for use after proper final grinding of the wearing section 13. If double blanks are used, they may be used as a double edged shear blade or can be severed through the center of the central backing section to form two single composite sheared blades which, after proper final grinding of the wearing section, are ready for use.

A shear blade made in accordance with my invention possesses the advantages as described for the hack saw blade in that the intermediate zone 15 has a substantial width and possesses within itself certain definite properties not obtainable by other methods of producing composite sections. The intermediate zone supports the wearing edge and adds strength to the entire shear blade. In addition, the single hardening and tempering treatment results in a blade in which the wearing edge has the required hardness for the desired wear resistance and, at the same time, possesses a backing zone which is in condition for machining without any further treatment. The intermediate zone produces a non-shatterable composite section which is an extremely important safety feature.

As illustrative of my invention, the wearing section 13 of the shear blade in this instance was of the following composition:

| | |
|---|---|
| C | 1.54 |
| Cr | 11.45 |
| V | .21 |
| Mo | .75 | and the backing section 14 was of the composition:

| | |
|---|---|
| C | .30 |
| Cr | .93 |
| Mo | .21 |

The weld wire was an ordinary low carbon plain steel welding rod containing about .08 carbon with no substantial amount of alloying constituents.

The intermediate zone 15 resulting from the use of such high carbon-high chrome section 13, weld rod and backing steel section 14 had the following composition:

| | |
|---|---|
| C | .63 |
| Cr | 4.70 |
| V | .09 |
| Mo | .37 |

It will be noted that the carbon contents and alloying constituents in the intermediate zone 15 are less than those in the high carbon-high chrome wearing zone 13, but greater than those in the backing steel zone 14.

In the claims the term "weld wire" is intended to include weld rod.

The invention is not limited to the preferred embodiment but may be otherwise embodied or practiced within the scope of the following claims.

I claim:

1. A method of making composite saw blade blanks and the like adapted to have their working edges hardened by heat treatment, each of said blanks composed of at least three distinct zones including a work zone, an intermediate fusion welded zone of substantial width and a backing zone, said method comprising forming an assemblage by alternately arranging, with their faces in substantially the same plane and with their edge portions juxtaposed, a plurality of thin steel sections adapted to form the work zones of said composite blanks and a plurality of thin steel sections adapted to form the backing zones of said composite blanks, said work zone sections having substantially higher carbon and alloy contents than said backing zone sections, joining the entire surface of the juxtaposed edge portions of said sections together by electric arc welding so as to fuse said edge portions and deposit from a weld wire beads of fused weld metal between said edge portions and form intermediate fusion zones between said work zones and said backing zones which are at least 0.150 inch wide, hot working said welded assemblage to reduce its thickness and refine the structure of the metal in said fusion zones by applying pressure to the faces of said work zone and backing sections, and severing said welded assemblage through said work zone sections to provide composite blanks each having a backing portion of said backing zone steel, at least one working portion of said working zone steel, and an intermediate fusion zone portion joining said backing and working portions.

2. A method of making composite saw blade blanks and the like adapted to have their working edges hardened by heat treatment, each of said blanks composed of at least three distinct zones including a work zone, an intermediate fusion welded zone of substantial width and a backing zone, said method comprising forming an assemblage by alternately arranging, with their faces in substantially the same plane and with their edge portions juxtaposed, a plurality of thin high speed steel sections adapted to form the work zones of said composite blanks and a plurality of softer and more easily machinable thin steel sections adapted to form the backing zones of said composite blanks, joining the entire surface of the juxtaposed edge portions of said sections together by electric arc welding so as to fuse said edge portions and deposit from a weld wire beads of fuzed weld metal between said edge portions and form intermediate fusion zones between said work zones and said backing zones which are at least 0.150 inch wide, hot working said welded assemblage to reduce its thickness and refine the structure of the metal in said fusion zones by applying pressure to the faces of said work zone and backing sections, and severing said welded assemblage through said work zone sections to provide composite blanks each having a backing portion of said backing zone steel, at least one working portion of said working zone high speed steel, and an intermediate fusion zone portion joining said backing and working portions.

3. A method of making composite saw blade blanks and the like adapted to have their working edges hardened by heat treatment, each of said blanks composed of at least three distinct zones including a work zone, an intermediate fusion welded zone of substantial width and a backing zone, said method comprising providing a plurality of thin steel sections adapted to form the work zones of said composite blanks and a plurality of thin steel sections adapted to form the backing zones of said composite blanks, each of said sections having faces which are wider than its thickness, alternately arranging said different sections with their faces extending in substantially the same horizontal plane and with their edges juxtaposed and extending in vertical planes, joining the entire surface of the juxtaposed edge portions of said sections together by electric arc welding so as to fuse said edge portions and deposit from a weld wire a bead of fused weld metal between said edge portions and form intermediate fusion zones between said work zones and said backing zones which are at least 0.150 inch wide, hot working said welded assemblage to reduce its thickness and refine the structure of the metal in said fusion zones by applying pressure to the faces of said work zone and backing sections, and severing said welded assemblage through said work zone sections to provide composite metal blanks each having a backing portion of said backing zone steel, at least one working portion of said working zone steel, and an intermediate fusion zone portion joining said backing and working portions.

References Cited in the file of this patent

UNITED STATES PATENTS

| Number | Name | Date |
|--------|------|------|
| 347,142 | Thomson | Aug. 10, 1886 |
| 907,167 | Neill | Dec. 22, 1908 |
| 1,407,794 | Lee | Feb. 28, 1922 |
| 1,535,096 | Blum | Apr. 28, 1925 |
| 1,784,080 | Stresau | Dec. 9, 1930 |
| 1,826,085 | Mulock | Oct. 6, 1931 |
| 1,867,345 | Andrus | July 12, 1932 |
| 1,887,372 | Emmons | Nov. 8, 1932 |
| 1,901,654 | Kerr | Mar. 14, 1933 |
| 2,148,925 | Bochy | Feb. 28, 1939 |
| 2,308,569 | St. Clair | Jan. 19, 1943 |
| 2,376,931 | Matson | May 29, 1945 |
| 2,431,517 | Stevens | Nov. 25, 1947 |
| 2,438,759 | Liebowitz | Mar. 30, 1948 |
| 2,457,616 | Van Dyke | Dec. 28, 1948 |
| 2,487,304 | Brauchler | Nov. 8, 1949 |
| 2,515,191 | Carpenter | July 18, 1950 |

FOREIGN PATENTS

| Number | Country | Date |
|--------|---------|------|
| 455,046 | Great Britain | Oct. 12, 1936 |
| 154,337 | Austria | Apr. 15, 1938 |
| 610,244 | Great Britain | Oct. 13, 1948 |
| 618,610 | Great Britain | Feb. 24, 1949 |

OTHER REFERENCES

"Welding Handbook," 1942 ed., pp. 794–795, pub. by American Welding Society, 33 W. Thirty-Ninth Street, New York, N. Y. Copy in Division 14.